United States Patent
Odinak et al.

(10) Patent No.: US 9,275,166 B2
(45) Date of Patent: Mar. 1, 2016

(54) OFF-LINE DELIVERY OF CONTENT THROUGH AN ACTIVE SCREEN DISPLAY

(76) Inventors: Gilad Odinak, Bellevue, WA (US); Maxim Shavit, Petach Tiqwa (IL)

(*) Notice: Subject to any disclaimer, the term of this patent is extended or adjusted under 35 U.S.C. 154(b) by 1028 days.

(21) Appl. No.: 13/377,524

(22) PCT Filed: Jun. 10, 2010

(86) PCT No.: PCT/US2010/038234
§ 371 (c)(1),
(2), (4) Date: Mar. 12, 2012

(87) PCT Pub. No.: WO2010/144750
PCT Pub. Date: Dec. 16, 2010

(65) Prior Publication Data
US 2012/0159287 A1    Jun. 21, 2012

Related U.S. Application Data

(60) Provisional application No. 61/186,347, filed on Jun. 11, 2009.

(51) Int. Cl.
*H04N 7/12* (2006.01)
*G06F 17/30* (2006.01)

(52) U.S. Cl.
CPC .................. *G06F 17/30905* (2013.01)

(58) Field of Classification Search
CPC .................. G06F 17/30905; G06F 3/147
USPC .................................................. 375/240.27
See application file for complete search history.

(56) References Cited

U.S. PATENT DOCUMENTS

| | | | |
|---|---|---|---|
| 6,326,985 B1* | 12/2001 | Tazoe et al. | 715/764 |
| 6,810,084 B1 | 10/2004 | Jun et al. | |
| 7,030,837 B1* | 4/2006 | Vong et al. | 345/1.3 |
| 7,231,529 B2 | 6/2007 | Park | |
| 7,552,801 B2 | 6/2009 | Trifu | |
| 2002/0067338 A1* | 6/2002 | Adan et al. | 345/156 |
| 2004/0128342 A1 | 7/2004 | Maes et al. | |
| 2005/0031308 A1* | 2/2005 | Fu et al. | 386/94 |
| 2006/0139444 A1* | 6/2006 | Sau et al. | 348/14.07 |
| 2007/0199020 A1 | 8/2007 | Kim et al. | |
| 2008/0250150 A1* | 10/2008 | Chang | 709/229 |
| 2009/0029671 A1 | 1/2009 | Cho et al. | |
| 2009/0171970 A1* | 7/2009 | Keefe | 707/10 |
| 2009/0177952 A1* | 7/2009 | Yokosato et al. | 714/799 |
| 2009/0295991 A1* | 12/2009 | Stafford et al. | 348/500 |
| 2010/0136943 A1* | 6/2010 | Hirvela et al. | 455/404.1 |
| 2010/0138365 A1* | 6/2010 | Hirvela et al. | 706/12 |
| 2010/0205162 A1* | 8/2010 | Davis | 707/698 |
| 2010/0293105 A1* | 11/2010 | Blinn et al. | 705/319 |

* cited by examiner

*Primary Examiner* — Jay Patel
*Assistant Examiner* — Francis G Geroleo
(74) *Attorney, Agent, or Firm* — Patrick J.S. Inouye; Krista A. Wittman

(57) ABSTRACT

A computer-implemented system and method for off-line delivery of content through an active screen display are provided. A processor includes an encoding application to assemble and encode digitally-stored content into encoded content, and to interleave the encoded content with a signal conveying a live screen representation. The live screen representation includes output of a user interface for applications executing on the processor. An active screen display is coupled to the processor over a physical display interface connection. The active screen display includes a runtime application to identify the encoded content within the signal on the active screen display and to decode the encoded content into decoded content. The active screen display further includes an offline application to unilaterally display the decoded content on the active screen display without use of the processor and in an absence of the live screen presentation.

20 Claims, 2 Drawing Sheets

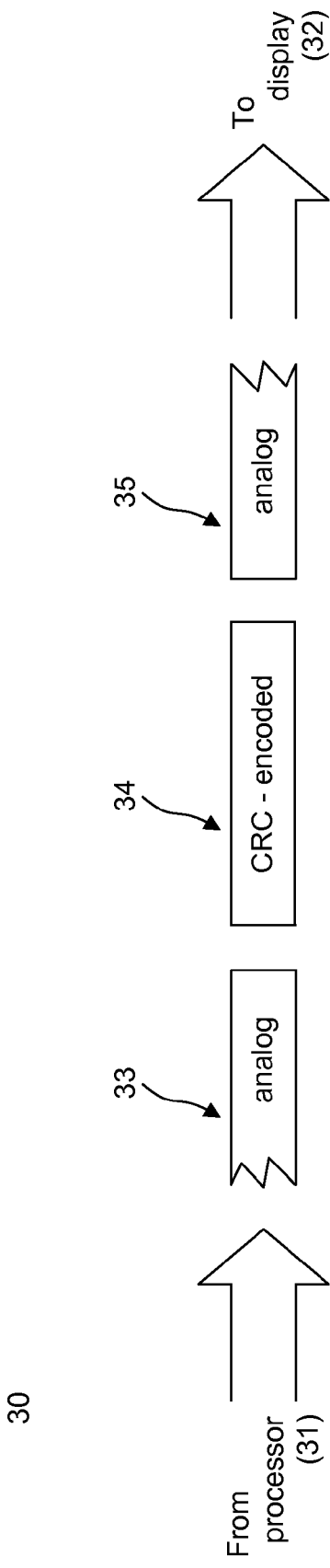

OFF-LINE DELIVERY OF CONTENT THROUGH AN ACTIVE SCREEN DISPLAY

TECHNICAL FIELD

The present invention relates in general to personal computer displays and, in particular, to a system and method for sending additional information to a personal computer display.

BACKGROUND ART

Personal computer and their attached monitors or displays, as well as laptop computers, have become common household appliances, with many homes having more than one personal computer system. The displays generally remain idle when the personal computer is not in use. Nevertheless, many personal computers are often located in central places in a home and the displays could potentially be used to independently display content, for example, pictures, calendar, or advertisements, that does not require the active computational resources of the personal computer.

Conventional software applications exist to utilize the display for such purposes. Generally, these applications require the personal computer to be turned on to display the content, even though the personal computer is not being used in a manner that involves active human user interaction via the user interface. While running, though, the personal computer consumes energy, is subject to wear and tear, and remains vulnerable to malicious software.

Personal computer displays are increasingly becoming available with onboard storage, external media readers, and internal logic to unilaterally display content, whether visual, audio, or both. For instance, active digital picture frames are widely available and include a receptacle to accommodate external storage media storing, for instance, digital pictures or music, even when not connected to an active "on" personal computer. However, loading the content from external media requires manual operation by the user and physical custody of the external media, such as a memory card, with the inconvenience of operating and increased costs associated with replicating user interface controls. Moreover, the content to be transferred to the active display oftentimes originates at the personal computer itself, and even though the two devices, the personal computer and the active display, may already be physically connected, a convenient and automated way to transfer the content into the active display's onboard is lacking.

One possible approach is to connect the processing unit of a personal computer to an active display using a special purpose cable or via wireless interconnect to transfer content from the personal computer into the active display's onboard memory. However, matching and compatible computers and active displays are required, in addition to specialized hardware for communication and labor for installation.

Therefore, there exists the need for a mechanism to transfer content from a personal computer or other external source to an active display for later viewing, particularly when the personal computer is turned off or inactive.

DISCLOSURE OF THE INVENTION

In one embodiment, an existing connection between the processing unit of a personal computer and an active display is utilized with the active display being provided with additional functionality. Specifically, a computer-implemented system and method for off-line delivery of content through an active screen display. A processor includes an encoding application to assemble and encode digitally-stored content into encoded content, and to interleave the encoded content with a signal conveying a live screen representation. The live screen representation includes output of a user interface for applications executing on the processor. An active screen display is coupled to the processor over a physical display interface connection. The active screen display includes a runtime application to identify the encoded content within the signal on the active screen display and to decode the encoded content into decoded content. The active screen display further includes an offline application to unilaterally display the decoded content on the active screen display without use of the processor and in an absence of the live screen presentation.

DESCRIPTION OF THE DRAWINGS

FIG. 3 is a flow diagram showing, by way of example, information encoded within a display signal.

BEST MODE FOR CARRYING OUT THE INVENTION

Figure 1:
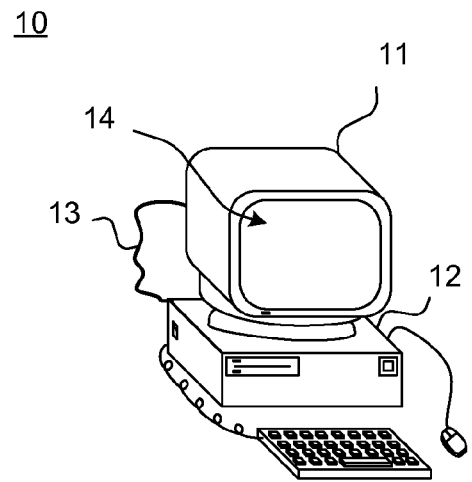
FIG. 1 is a functional block diagram showing a system for sending additional information to a personal computer display in accordance with one embodiment.

Typically, a personal computer connects to a display monitor using an analog data transmission cable, such as an RGB ("red, green, blue") cable, although other data transmission formats exists, such as described in http://computer.howstuffworks.com/monitor3.htm, the disclosure of which is incorporated by reference. FIG. 1 is a functional block diagram showing a system 10 for sending additional information to a personal computer display 11 in accordance with one embodiment. A connection 13 between the processing unit 12 of the personal computer system 10 carries the information required to render images 14 prepared by the computer hardware to the display 11.

Figure 2:
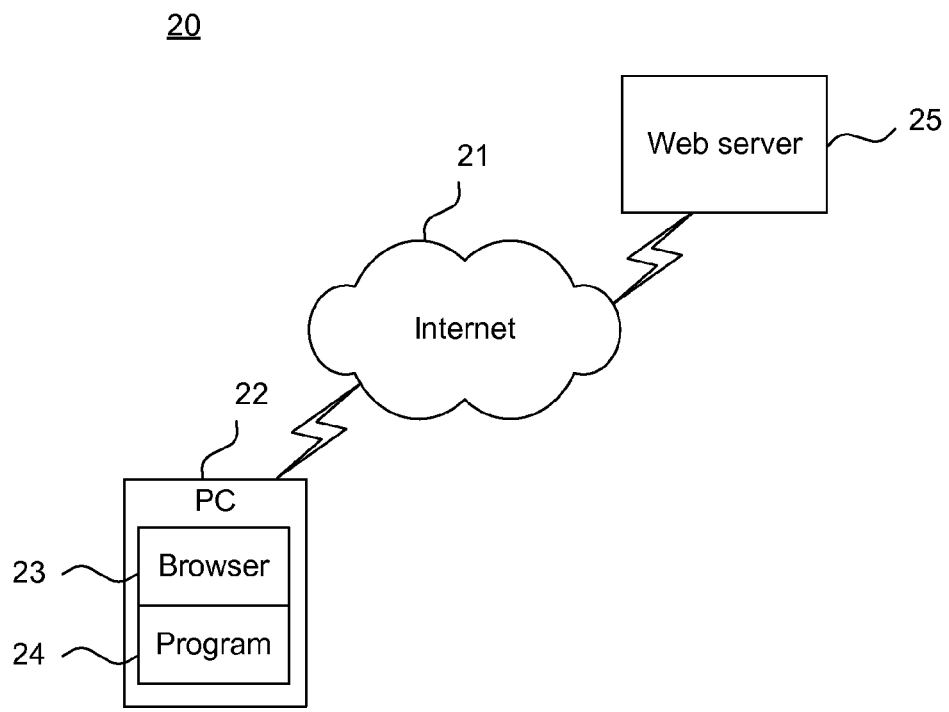
FIG. 2 is a functional block diagram showing, by way of example, an environment within which the system of FIG. 1 operates.

Conventionally, the connection 13 lacks the ability to deliver significant amounts of data during normal operation. An application program, either residing on the personal computer locally, or externally delivered from an external source, such as removable media or over the Internet, encodes content to be displayed at a later time as an image on the display 11. FIG. 2 is a functional block diagram showing, by way of example, an environment 20 within which the system 10 of FIG. 1 operates. The personal computer 22 can be remotely interconnected to a Web server 25, either through wired or wireless connection, via an internetwork, such as the Internet. The personal computer 22 executes the application program 24 and can additional execution a Web browser 23, with which to access Web content. The application program 24 provides logic for simultaneously delivering content from the processing unit of a personal computer to an active display. The content is sent as part of the images 14 being displayed under normal interactive use, but is encoded in a way that enables the active display to recognize the content as content to be displayed at a later, particularly when the personal computer is turned off or inactive.

The encoding scheme triggers another application program, which resides in the active display, to decode and positively identify the information as content to be displayed at a later time. FIG. 3 is a flow diagram showing, by way of example, information 30 encoded within a display signal. In a further embodiment, the information may include additional instructions, for example, timing, ordering, placement, and other directions pertaining to display of the content.

A suitable encoding scheme encodes arbitrary data sent from a processor 31 to a display 32 in a way that creates a pattern that follows certain rules. The active display 11 (shown in FIG. 1) checks the incoming stream of data. When the application program on the active display 11 recognizes a section that follows the rules, the data is saved for later use. The encoding scheme is chosen to minimize the chances that arbitrary data sent to the active display 11 will be erroneous decoded and misidentified as content to be displayed at a later time.

One suitable encoding scheme partitions the additional data sent to the active display 11 into fixed length blocks 33-34, and applies a Cyclic Redundancy Check (CRC) to each block, such as described in http://en.wikipedia.org/wiki/Cyclic_redundancy_check, the disclosure of which is incorporated by reference. As the active display 11 receives the data from the personal computer, a CRC is computed on an ongoing basis. Whenever the CRC correctly validates a block 33-34, the active display 11 stores the data in the block for later use.

Another suitable encoding scheme uses a Message Digest, for example MD5, such as described in http://en.wikipedia.org/wiki/Md5, the disclosure of which is incorporated by reference. In a manner similar to that used with a CRC, the application program 24 on the personal computer 22 (both shown in FIG. 2) creates an identifier for each data block 33-34 and sends the identifier together with the data. At the receiving end, the active display 11 independently calculates the MD5 hash code and compares the result to the one identifier with the data. If the identifier and hash code match, the data in the block is stored for later use. Still other suitable encoding schemes are possible.

Attempting to decode each possible sequence of bits in the incoming data stream can be computationally expensive. In a further embodiment, to lower computational expense, the personal computer prepends a preamble (not shown) to mark or delimit the beginning of each block 33-34. The active display 11 scans the incoming data for the preamble and only starts decoding the data for potential additional data when a preamble is encountered. Other markings or delimiters are possible, and can be provided prior to, within, or after the additional data.

The data to be actively displayed is often transmitted from the processing unit 12 of the personal computer 10 to the active display 11 using an analog connection 13. Such connections, though, can be prone to distortions and transmission errors, which can degrade the quality of the image displayed. Moreover, these errors can potentially corrupt the additional data being transferred. In a still further embodiment, to reduce or overcome such errors, the data blocks can be further supplemented with error correction information, for example, by using the Reed Solomon Code, such as described in http://en.wikipedia.org/wiki/Reed-Solomon_code, the disclosure of which is incorporated by reference. Other error correction schemes are possible.

The additional data to be delivered to the active display 11 can originate, for instance, on the personal computer itself, from removable media, or via a remote Internet site. A section on the screen can be set aside to signal on-going transfer of the additional data. The section can be, for example, a rectangular window or an icon in the system task bar, preferably with a human readable caption, explaining its purpose. Inside the section, the user will see seemingly meaningless shapes and colors; however, the active display 11 receiving the information will recognize the additional data thus displayed as content to be saved for later use by employing the above described techniques.

In further embodiment, when the active display 11 recognizes an area on the screen as being used to transfer the additional data, an alternate image can be displayed in that area, perhaps using other previously saved data, or the area could be left blank, as to not distract the user with seemingly meaningless image.

In yet another embodiment, the additional data may be interleaved with other meaningful images, such that the additional data would not marginally degrade the quality of the main image being actively displayed. A stronger version of the above-mentioned encodings and error correction mechanisms could then be employed to recover the additional data from the main image.

The transfer of data from, for example, a particular Web site served by a Web server 25 to the active display 11 will usually be initiated by the user of the personal computer 22 while the computer is turned on. At times, the active display 11 may need to prompt the user to access the Web site to facilitate the transfer of the additional data. The active display 11 may resize the image sent by the personal computer to not cover the entire screen. The active display 11 may also generate a message or reminder instructing the user on how to access the Web site. Once the information has been transferred, the active display 11 resumes normal operation.

While the invention has been particularly shown and described as referenced to the embodiments thereof, those skilled in the art will understand that the foregoing and other changes in form and detail may be made therein without departing from the spirit and scope of the invention.

The invention claimed is:

1. A computer-implemented system for off-line delivery of content through an active screen display, comprising:
 a processor, comprising:
  an encoding application to assemble and encode digitally-stored content into encoded content and to interleave the encoded content with a signal conveying a live screen representation, wherein the live screen representation comprises data to be actively displayed under normal interactive use as output of a user interface for applications executing on the processor; and
 an active screen display coupled to the processor over a physical display interface connection, comprising:
  a runtime application to identify on the active screen display the encoded content within the signal as distinct from the live screen representation and to decode the encoded content into decoded content that is to be displayed at a time separate from a display of the live screen representation; and
  an offline application to unilaterally display only the decoded content on the active screen display without use of the processor and in an absence of the live screen representation being displayed under normal interactive use.

2. A computer-implemented system according to claim 1, wherein the digitally-stored content to be encoded is provided from at least one of local storage coupled to the processor, removable storage removable coupled to the processor, and over a remote source interconnected to the processor through a network.

3. A computer-implemented system according to claim 2, wherein the remote source comprises a Web server, further comprising:

a Web browser to interface to the Web server over the network through an interactive session during which the digitally-stored content to be encoded is selected.

4. A computer-implemented system according to claim 1, wherein a marker is embedded within the signal that conveys the live screen representation being displayed under normal interactive use as a delimiter separating the encoded content from the live screen representation, wherein the marker is recognized during the identification of the encoded content on the active screen display.

5. A computer-implemented system according to claim 1, wherein the encoding application applies an error correction coding scheme to the encoded content on the processor prior to the interleaving with the live screen representation within the signal that conveys the live screen representation being displayed under normal interactive use, and the runtime application validates the error correcting coding of the encoded content on the active display upon receipt.

6. A computer-implemented system according to claim 5, wherein a Reed Solomon error correction coding scheme is applied.

7. A computer-implemented system according to claim 1, wherein the digitally-stored content is encoded using one of a cyclic redundancy check and message digest.

8. A computer-implemented system according to claim 1, wherein one or more of timing, ordering, placement, and directions for display of the decoded content are included as part of the content encoded.

9. A computer-implemented system according to claim 1, wherein the live screen representation comprises at least one image with which the digitally-stored content is encoded.

10. A computer-implemented system according to claim 1, further comprising:
indicating an on-going transfer of the encoded content within the signal through an indication provided as part of the live screen representation.

11. A computer-implemented method for off-line delivery of content through an active screen display, comprising:
assembling and encoding digitally-stored content into encoded content on a processor coupled to an active screen display;
interleaving the encoded content with a signal conveying a live screen representation to the active screen display over a physical display interface connection, wherein the live screen representation comprises data that is actively displayed under normal interactive use as output of a user interface for applications executing on the processor;
identifying on the active screen display the encoded content within the signal as distinct from the live screen representation and decoding the encoded content into decoded content that is to be displayed at a time separate from a display of the live screen representation; and
unilaterally displaying only the decoded content on the active screen display without use of the processor and in an absence of the live screen representation being displayed under normal interactive use.

12. A computer-implemented method according to claim 11, further comprising:
providing the digitally-stored content to be encoded from at least one of local storage coupled to the processor, removable storage removable coupled to the processor, and over a remote source interconnected to the processor through a network.

13. A computer-implemented method according to claim 12, wherein the remote source comprises a Web server, further comprising:
interfacing to the Web server over the network through an interactive session during which the digitally-stored content to be encoded is selected.

14. A computer-implemented method according to claim 11, further comprising:
embedding a marker within the signal that conveys the live screen representation being displayed under normal interactive use as a delimiter separating the encoded content from the live screen representation, wherein the marker is recognized during the identification of the encoded content on the active screen display.

15. A computer-implemented method according to claim 11, further comprising:
applying an error correction coding scheme to the encoded content on the processor prior to the interleaving with the live screen representation within the signal that conveys the live screen representation being displayed under normal interactive use; and
validating the error correcting coding of the encoded content on the active display upon receipt.

16. A computer-implemented method according to claim 15, wherein a Reed Solomon error correction coding scheme is applied.

17. A computer-implemented method according to claim 11, wherein the digitally-stored content is encoded using one of a cyclic redundancy check and message digest.

18. A computer-implemented method according to claim 11, further comprising:
including one or more of timing, ordering, placement, and directions for display of the decoded content as part of the content encoded.

19. A computer-implemented method according to claim 11, wherein the live screen representation comprises at least one image with which the digitally-stored content is encoded.

20. A computer-implemented method according to claim 11, further comprising:
indicating an on-going transfer of the encoded content within the signal through an indication provided as part of the live screen representation.

\* \* \* \* \*